United States Patent [19]
Gallucci

[11] Patent Number: 5,260,374
[45] Date of Patent: * Nov. 9, 1993

[54] POLYPHENYLENE ETHER POLYAMIDE BLENDS

[75] Inventor: Robert R. Gallucci, Pittsfield, Mass.

[73] Assignee: General Electric Company, Pittsfield, Mass.

[ * ] Notice: The portion of the term of this patent subsequent to May 10, 2009 has been disclaimed.

[21] Appl. No.: 635,063

[22] Filed: Dec. 28, 1990

Related U.S. Application Data

[63] Continuation of Ser. No. 298,814, Jan. 18, 1989, abandoned, which is a continuation of Ser. No. 816,470, Jan. 6, 1986, abandoned.

[51] Int. Cl.$^5$ .................................................. C08L 77/00
[52] U.S. Cl. ..................................... 525/66; 525/179; 525/182; 525/183; 525/178
[58] Field of Search ................... 575/66; 525/178, 179, 525/182, 183

[56] References Cited

U.S. PATENT DOCUMENTS 5,132,365  7/1992  Gallucci .............................. 525/92

Primary Examiner—Ana L. Carrillo

[57] ABSTRACT

The present invention relates to improved polyphenylene ether-polyamide composition wherein the polyamide component comprises a mixture of amorphous and crystalline polyamide.

16 Claims, No Drawings

POLYPHENYLENE ETHER POLYAMIDE BLENDS

This is a continuation of application Ser. No. 07/298,814, filed Jan. 18, 1989 now abandoned, which is a continuation of Ser. No. 816,470 which was filed Jan. 6, 1986 now abandoned.

The present invention relates to novel polyphenylene ether polyamide blends having improved impact strength. Specifically, polyphenylene ether-polyamide blends employing a combination of amorphous and crystalline polyamide have improved impact strength as compared to polyphenylene ether-polyamide blends employing only one polyamide.

Blends of polyphenylene ether and polyamide have long been known. Finholt (U.S. Pat. No. 3,379,792) taught improved processability of polyphenylene ethers by incorporating therein up to 25% by weight of polyamide. Additionally, Maruyama et al (U.S. Pat. No. 4,338,421) discloses a process for preparing polyphenylene ether-polyamide blends of 30 to 95% by weight polyamide for improved physical characteristics. Finally, Sugio et al (European pp. 131445) disclose blends of polyphenylene ether and aromatic polyamides for improved solvent resistance and tensile properties.

While such blends have certain desired characteristics, the utility and commercial success has been marred by the poor compatibility between the polyphenylene ether and polyamide. Recently compatibility of such blends has been enhanced by incorporating therein a compatibilizing agent. Ueno et al. (U.S. Pat. No. 4,315,080) taught the use of liquid diene polymers, epoxy compounds and compounds having in the molecule both (a) a carbon-carbon double bond or a carbon-carbon triple bond and (b) a carboxylic acid, acid anhydride, acid amide, imide, carboxylic acid ester, amino or hydroxyl group as compatibilizers. Kasahara et al (EP 46040) teach copolymers of vinyl aromatic compounds and either an alpha, beta-unsaturated dicarboxylic acid anhydride or an imide compound thereof as compatibilizer. Van der Meer (U.S. application Ser. No. 739,401, filed May 30, 1985) teaches oxidized polyolefin waxes as compatibilizers. Finally, Gallucci et al (U.S. pending application Ser. No. 736,489 now abandoned and Ser. No. 669,130 now abandoned filed May 20, 1985 and Nov. 7, 1984, respectively) teach aliphatic polycarboxylic acids and silane derivatives, respectively, as compatibilizing agents for such polyphenylene ether-polyamide blends.

Additionally, it is known to add various rubbery polymers and copolymers to further enhance the impact strengths of the foregoing compatibilized polyphenylene ether-polyamide blends. Especially preferred are the styrene-butadiene-styrene and styrene-hydrogenated butadiene-styrene block copolymers as well as the functionalized olefinic and/or vinyl aromatic copolymers.

While the foregoing compatibilized and rubber modified blends exhibit good mechanical properties, their impact strengths are still not entirely suitable for certain high stress applications. Additionally, these compositions are found to have a high degree of swell when soaked in water.

Thus, it is an object of the present invention to provide polyphenylene ether-polyamide composition of enhanced impact strength.

It is also an object of the present invention to provide polyphenylene ether-polyamide composition having reduced water absorption.

SUMMARY OF THE INVENTION

In accordance with the present invention, polyphenylene ether-polyamide compositions having unexpectedly improved impact strength and/or reduced water absorption may be prepared by employing as the polyamide component a combination of at least one amorphous polyamide and at least one crystalline polyamide.

In general, the compositions of the present invention are prepared from (a) at least one polyphenylene ether and (b) a combination of polyamides at least one of which is an amorphous polyamide and at least one of which is a crystalline polyamide Optionally, but preferably, a compatibilizing agent will be employed in the preparation of the compositions of the present invention. Especially preferred compatibilizing agents will be selected from the group consisting of (i) liquid diene polymers
(ii) epoxy compounds
(iii) quinones
(iv) oxidized polyolefin wax
(v) organosilane compounds having in the molecule both (a) at least silicon bonded to carbon through an oxygen link and (b) at least one ethylenic carbon-carbon double bond or carbon-carbon triple bond and/or functional group selected from the group consisting of an amine group or a mercapto group, and (vi) polyfunctional compounds having in the molecule (A) both (a) at least one carbon-carbon double bond or carbon-carbon triple bond and (b) at least one carboxylic acid, acid halide, anhydride, acid anhydride halide, acid amide, acid ester, imido, amino or hydroxyl group; (B) both (a) a group represented by the formula (OR) wherein R is hydrogen or an alkyl, aryl, acyl or carbonyl dioxy group and (b) at least two groups, each of which may be the same or different, selected from carboxylic acid, acid halide, anhydride, acid anhydride halide, acid ester, acid amide, imido, amino and salts thereof or (C) both (a) an acid halide group and (b) a group selected from carboxylic acid, carboxylic acid anhydride, acid ester or acid amide.

The compositions of the present invention will generally be prepared from 5 to 95, preferably 30 to 70, percent by weight polyphenylene ether (a), and from about 5 to 95, preferably 30 to 70, percent by weight polyamide (b), wherein the weight ratio of amorphous polyamide to crystalline polyamide is 9:1 to 1:9, preferably 7:3 to 3:7, and, if present, 0.1 to 30 parts by weight of the compatibilizing agent, based on 100 by weight of the total of the polyphenylene ether and polyamides.

Finally, the composition of the present invention may further comprise a rubbery polymer or copolymer for additionally enhanced impact strength. When employed, the rubbery copolymer will generally be used in an amount of from about 5 to about 100 parts, preferably for about 10 to about 40 parts by weight based on 100 parts by weight of the total of the polyphenylene ether and polyamides.

DETAILED DESCRIPTION

The polyphenylene ethers suitable for use in the practice of the present invention are well known in the art and may be prepared by any of a number of catalytic and non-catalytic processes from corresponding phenols or reactive derivatives thereof. Examples of polyphenylene ethers and methods for their production are disclosed in U.S. Pat. Nos. 3,306,874; 3,306,875; 3,257,357; 3,257,358; 3,337,501 and 3,787,361, all incorporated herein by reference. For brevity, the term "polyphenylene ether" as used throughout this specification and the appended claims will include not only unsubstituted polyphenylene ether (made from phenol) but also polyphenylene ethers substituted with various substituents. The term also includes polyphenylene ether copolymers, graft copolymers and block copolymers, especially graft copolymers of alkenyl aromatic compounds, especially vinyl aromatic compounds, as disclosed below, and a polyphenylene ether.

Suitable phenol compounds for the preparation of the polyphenylene ethers may be represented by the general formula:

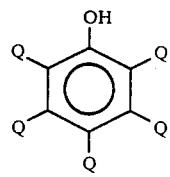

wherein each Q is a monovalent substituent individually selected from the group consisting of hydrogen, halogen, aliphatic and aromatic hydrocarbon and hydrocarbonoxy radicals free of a tertiary alpha-carbon atom and halohydrocarbon and halohydrocarbonoxy radicals free of a tertiary alpha-carbon atom and having at least two carbon atoms between the halogen atom and the phenyl nucleus, and wherein at least one Q is hydrogen.

As specific examples of the phenol compound represented by the above formula, there may be given phenol; o-, m- and p- cresols; 2,6, 2,5, 2,4 and 3,5 dimethylphenols; 2-methyl-6-phenyl-phenol; 2,6-diphenylphenol; 2,6-diethylphenol; 2-methyl-6-ethylphenol; and 2,3,5-, 2,3,6- and 2,4,6-trimethylphenols. Two or more phenol compounds may be used in combination should copolymers be desired. Additionally, copolyphenylene ethers may also be prepared from a phenol compound of the above general formula with a phenol compound not represented by the above general formula including, for example, a dihydric phenol such as bisphenol-A, tetrabromobisphenol-A, resorcinol or hydroquinone.

Illustrative of suitable polyphenylene ethers there may be given, for example, poly(2,6 dimethyl-1,4-phenylene)ether; poly(2-methyl-1,4-phenylene)ether, poly(3-methyl-1,4-phenylene)ether; poly(2,6-diethyl-1,4-phenylene)ether; poly(2-methyl-6-allyl-1,4-phenylene)ether; poly(2,6-dichloromethyl-1,4-phenylene)ether; poly(2,3,6-trimethyl-1,4-phenylene) ether; poly-(2,3,5,6-tetramethyl-1,4-phenylene)ether; poly(2,6-dichloro-1,4-phenylene)ether; poly(2,6-diphenyl-1,4-phenylene)ether; poly(2,5-dimethyl-1,4-phenylene)ether and the like. Further, as mentioned above, copolymers of the phenol compounds may also be used.

Preferred polyphenylene ethers will have a plurality of repeating units of the formula:

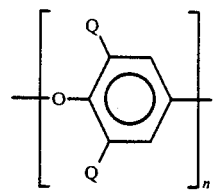

where Q is as defined above and n is at least 50, preferably from about 50 to about 200. Examples of polyphenylene ethers corresponding to the above formula can be found in the above referenced patents and include, among others: poly(2,6-dilauryl-1,4-phenylene)ether; poly(2,6-diphenyl-1,4-phenylene)ether; poly(2,6-dimethyoxy-1,4-phenylene)ether; poly(2,6-diethoxy-1,4-phenylene)ether; poly(2-methoxy-6-ethyoxyphenylene)ether; poly(2-ethyl-6-stearyloxy-1,4-phenylene)ether; poly-(2,6-dichloro-1,4-phenylene)ether; poly(2-methyl-6-phenyl-1,4-phenylene)ether poly(2,6-dibenzyl-1,4-phenylene)ether; poly(2-ethoxy-1,4-phenylene)ether; poly(2-chloro-1,4-phenylene)ether; poly(2,6-dibromo-1,4-phenylene)ether; and the like.

For the purpose of the present invention, an especially preferred family of polyphenylene ethers include those having a $C_1$ to $C_4$ alkyl substitution in the two positions ortho to the oxygen ether atom. Illustrative members of this class are: poly(2,6-dimethyl-1,4-phenylene)ether; poly(2,6-diethyl-1,4-phenylene)ether; poly(2-methyl-6-ethyl-1,4-phenylene)ether; poly(2,6-dipropyl-1,4-phenylene)ether; poly(2-ethyl-6-propyl-1,4-phenylene)ether; and the like; most preferably poly(2,6-dimethyl-1,4-phenylene)ether.

One method for the production of the above polyphenylene ethers is by the oxidation of a phenol compound with oxygen or an oxygen-containing gas in the presence of a catalyst for oxidative coupling. There is no particular limitation as to the choice of catalysts and any catalysts for oxidation polymerization can be employed. As typical examples of the catalyst, there may be given a catalyst comprising a cuprous salt and a tertiary amine and/or secondary amine, such as cuprous chloride-trimethylamine and dibutylamine, cuprous acetate-triethylamine or cuprous chloride-pyridine; a catalyst comprising a curpic salt, a tertiary amine, and an alkali metal hydroxide, such as cupric chloride-pyridine-potassium hydroxide; a catalyst comprising a manganese salt and a primary amine, such as manganese chloride-ethanolamine or manganese acetate-ethylenediamine; a catalyst comprising a manganese salt and an alcoholate or phenolate, such as manganese chloride-sodium methylate or manganese chloride-sodium phenolate; and a catalyst comprising a cobalt salt and a tertiary amine.

The polyamide component (b) of the compositions of the present invention comprises a mixture of at least one amorphous polyamide and at least one crystalline polyamide. In general, polyamides suitable for the preparation of the compositions of the present invention may be obtained by polymerizing a monoamino-monocarboxylic acid or a lactam thereof having at least 2 carbon atoms between the amino and carboxylic acid group; or by polymerizing substantially equimolar proportions of a diamine which contains at least 2 carbon atoms between the amino groups and a dicarboxylic acid; or by polymerizing a monoaminocarboxylic acid or a lactam thereof together with substantially equimolecular proportions of a diamine and a dicarboxylic acid. The dicarboxylic acid may be used in the form of a functional derivative thereof, for example an ester or acid chloride.

The term "substantially equimolecular" proportions (of the diamine and of the dicarboxylic acid) is used to cover both strict equimolecular proportions and slight departures therefrom which are involved in conventional techniques for stabilizing the viscosity of the resultant polyamides.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. As particular examples of aminocarboxylic acids and lactams there may be mentioned 6-aminocaproic acid, butyrolactam, pivalolactam, caprolactam, capryl-lactam, enantholactam, undecanolactam, dodecanolactam and 3- and 4-aminobenzoic acids.

Diamines suitable for use in the preparation of the polyamides include the alkyl, aryl and alkyl-aryl diamines Such diamines include, for example, those represented by the general formula:

$$H_2N(CH_2)_nNH_2$$

wherein n is an integer of from 2 to 16, such as trimethylenediamine, tetramethylenediamine, pentamethylenediamine, octamethylenediamine and especially hexamethylenediamine, as well as trimethyl hexamethylene diamine, meta-phenylene diamine, meta-xylylene diamine and the like.

The dicarboxylic acids may be aromatic, for example isophthalic and terephthalic acids or aliphatic, wherein the aliphatic dicarboxylic acids are of the formula $$HOOC—Y—COOH$$

wherein Y represents a divalent aliphatic group containing at least 2 carbon atoms. Examples of such acids are sebacic acid, octadecanedoic acid, suberic acid, glutaric acid, pimelic acid and adipic acid.

Typical examples of the polyamides or nylons, as these are often called, include for example
  polypyrrolidone: (nylon 4)
  polycaprolactam: (nylon 6)
  polycapryllactam: (nylon 8)
  polyhexamethylene adipamide: (nylon 6,6)
  polyundecanolactam: (nylon 11)
  polydodecanolactam: (nylon 12)
  polyhexamethylene azelaiamide: (nylon 6,9)
  polyhexamethylene sebacamide: (nylon 6,10)
  polyhexamethylene isophthalamide: (nylon 6,I)
  polyhexamethylene terephthalamide: (nylon 6,T)
  polyamide of hexamethylene diamine: (nylon 6,12)
and n-dodecanedioic acid
as well as polyamides resulting from terephthalic acid and/or isophthalic acid and trimethyl hexamethylene diamine, polyamides resulting from adipic acid and meta xylylenediamines, polyamides resulting from adipic acid, azelaic acid and 2,2-bis-(p-aminocyclohexyl)propane and polyamides resulting from terephthalic acid and 4,4'-diamino-dicyclohexylmethane.

Copolymers of the foregoing polyamides or prepolymers thereof are also suitable for use in the practice of the present invention. Such copolyamides include copolymers of the following.
  hexamethylene adipamide/caprolactam: (nylon 6,6/6)
  hexamethylene adipamide/hexamethylene-isophthalimide: (nylon 6,6/6,I)
  hexamethylene adipamide/hexamethylene-terephthalamide: (nylon 6,6/6,T)
  hexamethylene adipamide/hexamethylene-azelaiamide: (nylon 6,6/6,9)
  hexamethylene adipamide/hexamethylene azelaiamide/caprolactam: (nylon 6,6/6,9/6)

Preferred polyamides are the polyamides 6; 6,6; 11 and 12, most preferably polyamide 6,6.

It is also to be understood that the use of the term "polyamides" herein and in the appended claims is intended to include the toughened or super tough polyamides. Super tough polyamides, or super tough nylons, as they are more commonly known, are available commercially, e.g. from E.I. duPont (Zytel ® ST resins), Wilson-Fiberfill (NY resins), Badische (ULTRAMID ® resins), Allied (CAPRON ® resins) and Celanese (7000 series resin), among others, or may be prepared in accordance with a number of U.S. Patents including, among others, Epstein - U.S. Pat. No. 4,174,358; Novak - U.S. Pat. No. 4,474,927; Roura - U.S. pat. No. 4,346,194; and Joffrion - U.S. Pat. No. 4,251,644, herein incorporated by reference. These super tough nylons are prepared by blending and/or reacting one or more polyamides with one or more polymeric or copolymeric elastomeric toughening agents. Suitable toughening agents are disclosed in the aboveidentified U.S. Patents as well as in Caywood, Jr. - U.S. Pat. No. 3,884,882 and Swiger, U.S. Pat. No. 4,147,740 and Galluoci et al., "Preparation and Reactions of Epoxy-Modified Polyethylene", J. APPL. POLY. SCI., V. 27, pp. 425–437 (1982) herein incorporated by reference and are described more fully below. Typically, these elastomeric polymers and copolymers may be straight chain or branched as well as graft polymers and copolymers, including core-shell graft copolymers, and are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer.

As mentioned above, the polyamide component of the compositions of the present invention must comprise at least one amorphous polyamide and at least one crystalline polyamide. Those knowledgeable of the polymer art and particularly the polyamide art will readily recognize the distinction between the two and be able to select the same from the generic description of polyamides above.

In general, amorphous polyamides are those polyamides of a glassy nature (as that term is used to refer to polymers) and, upon heating, will exhibit only a glass transition temperature, which in preferred amorphous polyamides will be above 100° C. Additionally, amorphous polyamides will generally have no distinct melting point and a heat of fusion of less than about 1 cal/-gram as measured by use of a differential scanning calorimeter (DSC).

Preferred amorphous polyamides are obtained from at least one aromatic dicarboxylic acid of 8–18 carbon atoms and at least one diamine selected from the class consisting of (i) 2–12 carbon normal aliphatic straight-chained diamines and (ii) 8-20 carbon cycloaliphatic diamines containing at least one cycloaliphatic ring. Especially preferred amorphous polyamides are those obtained from (a) isophthalic and/or terephthalic acid, particularly those containing 60 to 70 mole % isophthalic acid and 40 to 30 mole % terephthalic acid and/or (b) hexamethylenediamine and/or bis(p-aminocyclohexyl)methane, particularly those containing 20 to 35 mole % bis(p-aminocyclohexyl)methane and 80 to 65 mole % hexamethylenediamines.

Crystalline polyamide, on the other hand, will be of a non-glassy nature having a defined crystalline or molecular structure and will have a distinct melting point at which the solid and liquid phases are in equilibrium. Preferred crystalline polyamides are those derived from lactam monomer, including copolymers of two or more lactam monomers as well as copolymers of at least 50% lactam monomer and a smaller quantity of other monomers.

In the practice of the present invention the weight ratio of the amorphous polyamide to crystalline polyamide will be from about 9:1 to 1:9, preferably from about 7:3 to 3:7.

The blending ratio of polyphenylene ether to polyamide is 5 to 95% by wt. preferably 30 to 70% by wt. of the former to 95 to 5% by wt., preferable 70 to 30% by wt. of the latter. When the polyamide is less that 5 wt. percent, its effect to improve solvent resistance is small, while when it exceeds 95 wt. percent, thermal properties such as heat distortion temperature and dimensional stability tend to become poor.

In the preferred embodiments of the present invention, a compatibilizing agent will be employed in the preparation of the compositions. When used herein and in the appended claims the term "compatibilizing agent" is meant to refer to those polyfunctional, non-rubbery compounds and/or polymers which interact with the polyphenylene ether, the polyamide or both, chemically, e.g. grafting, or physically, e.g. by altering the surface characteristics of the dispersed phase and/or enhancing the dispersion thereof, so as to improved the compatibility of the resin mixture, particularly as evidenced by enhanced impact strength, weld line strength, and/or elongation. Many suitable compatibilizing agents for the polyphenylene ether-polyamide blend are well known, as disclosed above, and additional compatiblizing agents are being identified as more and more is learned about the polyphenylene ether-polyamide system. All such compatibilizing agents are intended to be within the full scope of the present invention.

Exemplary of the various compatibilizing agents that may be employed in the practice of the present invention there may be given:
 a) liquid diene polymers
 b) epoxy compounds
 c) quinones
 d) oxidized polyolefin wax
 e) organosilane compounds and
 f) polyfunctional compounds as described hereinafter.

Liquid diene polymers suitable for use herein include homopolymers of a conjugated diene and copolymers of a conjugated diene with at least one monomer selected from the group consisting of other conjugated dienes; vinyl monomer, e.g. styrene, and alpha-methyl styrene and olefins, e.g. ethylene, propylene, butene-1, isobutylene, hexene-1, octene-1 and dodecene-1, and mixtures thereof, having a number average molecular weight of from 150 to 10,000 preferably 150 to 5,000. These homopolymers and copolymers can be produced by the methods described in, for example, U.S. Pat. Nos. 4,054,612; 3,876,721 and 3,428,699, incorporated herein by reference, and include, among others, polybutadiene, polyisoprene, poly(1,3-pentadiene), poly(-butadiene-isoprene), poly(styrene-butadiene), polychloroprene, poly(butadiene-alpha methyl styrene), poly(-butadienestyrene-isoprene), poly(butylene-butadiene) and the like.

As epoxy compounds suitable for use in the practice of the present invention there may be given (1) eopxy resins produced by condensing polyhydric phenols (e.g. bisphenol-A, tetrabromobisphenol-A, resorcinol and hydroquinone) and epichlorohydrin; (2) epoxy resins produced by condensing polyhydric alcohols (e.g. ethylene glycol, propylene glycol, butylene glycol, polyethylene glycol, polypropylene glycol, pentaerythritol an trimethylolethane and the like) and epichlorohydrin; (3) glycidyletherified products of monohydric alcohols and monohydric phenols including phenyl glycidylether, butylglycidyl ether and cresyl glycidylether; (4) glycidyl derivatives of amino compounds for example, the diglycidyl derivative of aniline, and (5) epoxidized products of higher olefinic or cycloalkene, or natural unsaturated oils (e.g. soybean) as well as of the foregoing liquid diene polymers.

Oxidized polyolefin waxes are well known and a description thereof and processes for the production of the same are found in U.S. Pat. Nos. 3,822,227 and 3,756,999 and German Patent Publications 3,047,915 and 2,201,862, herein incorporated by reference. Generally, these are prepared by an oxidation or suspension oxidation of polyolefin. An especially preferred polyolefin wax is "Hoescht Wacks".

Quinone compounds suitable for use herein are characterized as having in the molecule of the unsubstituted derivative at least one 6 membered carbon ring; at least two carbonyl groups (ic=0) in the ring structure, both of which may be in the same or, if more than one ring, different rings, provided that they occupy positions corresponding to the 1,2- or 1,4-orientation of the monocyclic quinone; and at least two ethylenic carbon-carbon double bonds in the ring structure. Where more than one ring is present in the unsubstituted quinone, the rings may be fused, non-fused or both: non-fused rings may be bound by a direct carbon--carbon double bond or by a hydrocarbon radical having conjugated unsaturation such as =C—C=.

Substituted quinones are also within the scope of the present invention. The degree of substitution; where substitution is desired, may be from one to the maximum number of replaceable hydrogen atoms. Exemplary of the various substituents that may be present on the unsubstituted quinone structures include halogen, e.g. chlorine, bromine, flourine, etc.; hydrocarbon radicals including branched and unbranched, saturated and unsaturated alkyl, aryl, alkyl aryl and cyclo alkyl radicals and halogenated derivatives thereof; and similar hydrocarbons having hetero atoms therein, particularly oxygen, sulfur or phosphorous and wherein the hetero atom connects the radical to the quinone ring (e.g. oxygen link).

Exemplary of the various quinones there may be given 1,2- and 1,4-benzoquinone; 2,6-diphenyl quinone; tetramethyldiquinone; 2,2'- and 4,4'-diphenoquinone; 1,2-, 1,4- and 2,6-naphthoquinone; chloranils; 2-chloro- 1,4-benzoquinone; 2,6-dimethyl benzoquinone and the like.

Organosilane compounds suitable as compatibilizing agents are characterized as having in the molecule (a) at least one silicon atom bonded to a carbon through an oxygen link and (b) at least one ethylenic carbon-carbon double bond or carbon-carbon triple bond and/or a functional group selected from the group consisting of amine group or a mercapto group provided that the functional group is not directly bonded to the silicon atom.

In such compounds, the C—O—Si component is generally present as an alkoxy or acetoxy group bonded directly to the silicon atom, wherein the alkoxy or acetoxy group generally has less than 15 carbon atoms and may also contain hetero atoms (e.g. oxygen). Additionally, there may also be more than one silicon atom in the compound, such multiple silicon atoms, if present being linked through an oxygen link (e.g. siloxanes), a silicon-silicon bond; or a bifunctional organic radical (e.g. methylene or phenylene groups).

Exemplary of suitable organosilane compounds there may be given gamma amino propyltriethoxy silane, 2-(3-cyclohexenyl)ethyl trimethoxy silane; 1,3-divinyl tetraethoxy silane; vinyl tris-(2-methoxyethoxy)silane; 5-(bicycloheptenyl)triethoxy silane and gamma mercapto propyl trimethoxy silane.

Finally, polyfunctional compounds which may be employed as compatibilizer in the practice of the present invention are of two types. The first type of polyfunctional compounds are those having in the molecule both (a) an ethylenic carbon-carbon double bond or a carbon-carbon triple bond and (b) at least one carboxylic acid, acid anhydride, acid halide, anhydride, acid halide anhydride, acid amide, acid ester, imide, amino, or hydroxy group. Exemplary of such polyfunctional compounds there may be given maleic acid; maleic anhydride; fumaric acid; citraconic acid; itaconic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (e.g. acrylic acid, butenoic acid, methacrylic acid, t-ethylacrylic acid, pentenoic acid); decenoic acids, undecenoic acids, dodecenoic acids, linoleic acid, etc.); esters, acid amides or anhydrides of the foregoing unsaturated carboxylic acids; unsaturated alcohols (e.g. allyl alcohol, crotyl alcohol, methyl vinyl carbinol, 4-pentene-1-ol, 1,4-hexadiene-3-ol, 3-butene-1,4-diol, 2,5-dimethyl-3-hexene-2,5-diol and alcohols of the formulae $C_nH_{2n-5}OH$, $C_nH_{2n-7}OH$ and $C_nH_{2n-9}OH$, wherein n is a positive integer up to 30), unsaturated amines resulting from replacing the —OH group(s) of the above unsaturated alcohols with $NH_2$ groups; and functionalized diene polymers and copolymers.

The second group of polyfunctional compatibilizer compounds suitable for use herein are characterized as having both (a) a group represented by the formula (OR) wherein R is hydrogen or an alkyl, aryl, acyl or carbonyldiocy group and (b) at least two groups each of which may be the same or different, selected from carboxylic acid, acid halide, anhydride, acid halide anhydride, acid ester, acid amide, imido, amino and salts thereof. Typical of this group of compatibilizers are the aliphatic polycarboxylic acids, acid esters and acid amides represented by the formula:

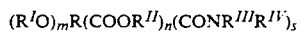

wherein R is a linear or branched chain, saturated aliphatic hydrocarbon of from 2 to 20, preferably 2 to 10, carbon atoms; $R^I$ is selected from the group consisting of hydrogen or an alkyl, aryl, acyl or carbonyl dioxy group of 1 to 10, preferably 1 to 6, most preferably 1 to 4, carbon atoms, especially preferred is hydrogen; each $R^{II}$ is independently selected from the group consisting of hydrogen or an alkyl or aryl group of from 1 to 20 carbon atoms, preferably from 1 to 10 carbon atoms; each $R^{III}$ and $R^{IV}$ is independently selected from the group consisting essentially of hydrogen or an alkyl or aryl group of from 1 to 10, preferably from 1 to 6, most preferably 1 to 4, carbon atoms; m is equal to 1 and (n+s) is greater than or equal to 2, preferably equal to 2 or 3, and n and s are each greater than or equal to zero and wherein $(OR^I)$ is alpha or beta to a carbonyl group and at least two carbonyl groups are separated by 2 to 6 carbon atoms. Obviously, $R^I$, $R^{II}$, $R^{III}$ and $R^{IV}$ cannot be aryl when the respective substituent has less than 6 carbon atoms.

Illustrative of suitable polycarboxylic acids there may be given citric acid, malic acid, and agaricic acid; including the various commercial forms thereof, such as, for example, the anhydrous and hydrated acids. Illustrative of acid esters useful herein include for example, acetyl citrate and mono- and/or di- stearyl citrates and the like. Suitable acid amides useful herein include for example N,N'-diethyl citric acid amide; N,N'-dipropyl citric acid amide; N-phenyl citric acid amide; N-dodecyl citric acid amide; N,N'-didodecyl citric acid amide and N-dodecyl malic acid amide. Derivatives of the foregoing polycarboxylic acids are also suitable for use in the practice of the present invention. Especially preferred derivatives are the salts thereof, including the salts with amines and/preferably, the alkali and alkaline metal salts. Exemplary of suitable salts include calcium malate, calcium citrate, potassium malate and potassium citrate.

The third group of polyfunctional compatibilizer compounds suitable for use herein are characterized as having both (a) at least one acid halide group, most preferably an acid chloride group and (b) at least one carboxylic acid, carboxylic acid anhydride, acid ester or acid amide group, preferably a carboxylic acid or carboxylic acid anhydride group. Exemplary of compatibilizers within this group there may be given trimellitic anhydride acid chloride, chloroformyl, succinic anhydride, chloroformul succinic acid, chloroformyl glutanic anhydride, chloroformyl glutanic acid, chloroacetyl succinic anhydride, chloroacetyl succinic acid, trimellitic acid chloride and chloroacetyl glutanic acid, especially preferred is trimellitic anyhydride acid chloride.

Each of the foregoing compatibilizing agents are more fully described in U.S. Pat. Nos. 4,315,086; U.S. patent applications Ser. Nos. 669,130, now abandoned 736,489 now abandoned and 780,151 now U.S. Pat. No. 4,824,915 filed Nov. 7, 1984, May 20, 1985, and Sep. 16, 1985, respectively, and European Patent Application No. 04640, altogether herein incorporated by reference.

The foregoing compatibilizing agents may be used alone or in any combination of one another. Furthermore, they may be added directly to the melt blend or precompounded with either or both the polyphenylene oxide and polyamide as well as with other resinous materials employed in the preparation of the compositions of the present invention. With many of the foregoing compatibilizing agents, particularly the polyfunctional compounds, even greater improvement in compatibility is found where at least a portion of the compatibilizing agent is precompounded with all or a part of the polyphenylene oxide. It is believed that such precompounding may cause the compatiblizing agent to react with the polymer and, consequently, functionalize that polymer. For example, the polyphenylene oxide may be precompounded with trimellitic acid chloride anhydride to form an anhydride functionalized polyphenylene ether which has improved compatibility with the polyamide than the non-functionalized polyphenylene ether.

Where the compatibilizing agent is employed in the preparation of the compositions of the present invention, the total amount used will be dependent upon the specific compatibilizing agent chosen and the specific polymeric system to which it is added as discussed in the foregoing references. Obviously, it is desirable to employ at least that amount which is necessary to enhance the compatibility of the polyphenylene ether polyamide blend. In general, the amount of compatibilizing agent will be from about 0.01 to about 30, preferably from about 0.1 to about 10, most preferably from about 0.1 to about 5 parts by weight per 100 parts by weight of the blend of polyphenylene ether and polyamide. It should be noted that where the compatibilizing agent is precompounded with or prereacted with a component of the compositions, or a part thereof, e.g. polyphenylene oxide, the weight amount pertains solely to the unreacted (pre-precompounded) compatibilizing agent, not the functionalized or precompounded material even though the latter may act as a compatiblizer itself. Thus, for example, if 35 parts by weight of polyphenylene ether were precompounded with 0.7 parts by weight trimellitic acid chloride anhydride and subsequently blended with an additional 15 parts by weight polyphenylene oxide and 50 parts by weight of polyamides, such composition would still be within the scope of the present invention. The 0.7 parts trimellitic acid chloride anhydride is the amount of compatibilizing agent employed not the 35.7 parts of precompounded product.

The above-mentioned compatibilizing agent may be employed alone or in combination with a primary or secondary amine. With certain of the foregoing compatibilizers, especially the polyfunctional compounds, it has been found that the presence of the amine often enhances certain physical properties, especially brightness of the compositions. Suitable amines include those primary and secondary amines having from 1 to about 20, preferably from 1 to about 10 carbon atoms. Illustrative of said suitable amines there may be given, methyl ethylamine, diethylamine, butylamine, dibutylamine, anline, n-octadecylamine and the like. The amount of the primary or secondary amine to be used is generally up to about 3 parts by wt., preferably from about 0.35 to about 1.5 parts by wt., based on 100 parts of the combination of polyphenylene ether and polyamide.

In the practice of the present invention, it may be further desirable to add an additional modifier resin or resin combination to further improve the physical properties, particularly the impact strength, and/or processability of the composition. Such modifier resins are well known in the art and are typically derived from one or more monomers selected from the group consisting of olefins, vinyl aromatic monomers, acrylic or alkyl acrylic acids and their ester derivatives as well as conjugated dienes. Especially preferred modifier resins are the rubbery high-molecular weight materials including natural and synthetic polymeric materials showing elasticity at room temperature. Suitable modifier resins include both homopolymers and copolymers, including random, block, radial block, graft and core-shell copolymers as well as combinations thereof.

Polyolefins or olefin-based copolymer employable in the practice of the present invention include, among others, low density polyethylene, high density polyethylene, linear low density polyethylene, isotactic polypropylene, poly(1-butene), poly(4-methyl-1-pentene), propylene-ethylene copolymers, and the like. Additional olefin copolymers include copolymers of one or more alpha olefins, particularly ethylene, with copolymerizeable monomers including for example vinyl acetate, acrylic acids and alkyl acrylic acids as well as the ester derivatives thereof including for example, ethylene acrylic acid, ethylacrylate, methacrylic acid, methyl methacrylate and the like. Finally, an additional class of olefin-based copolymers suitable for use herein include the ionomer resins, which may be wholly or partially neutralized with metal ions.

A second class of modifier resins employable herein are those derived from the vinyl aromatic monomers. These include, for example, modified and unmodified polystyrenes, ABS type graft copolymers; AB and ABA type block and radial block copolymers and vinyl aromatic conjugated diene core-shell graft copolymers. Modified and unmodified polystyrenes include homopolystyrenes and rubber modified polystyrenes, such as butadiene rubber modified polystyrene otherwise referred to as high impact polystyrene or HIPS. Additional useful polystyrenes include copolymers of styrene and various monomers, including for example, poly(styrene-acrylonitrile) (SAN), styrene-butadiene copolymers as well as the modified alpha and para substituted styrenes and any of the styrene resins disclosed in U.S. Pat. No. 3,383,435, herein incorporated by reference. ABS type of graft copolymers are typified as comprising a rubbery polymeric backbone derived from a conjugated diene alone or in combination with a monomer copolymerizable therewith having grafted thereon at least one monomer, and preferably two, selected from the group consisting of monoalkenyl arene monomers and substituted derivatives thereof as well as acrylic monomers such as acrylonitriles and acrylic and alkyl acrylic acids and their esters.

An especially preferred class of vinyl aromatic monomer derived polymer resins are the block copolymers comprising monoalkenyl arene blocks and hydrogenated, partially hydrogenated and non-hydrogenated conjugated diene blocks and represented as AB and ABA block copolymers. Suitable AB type block copolymers are disclosed in for example U.S. Pat. Nos. 3,078,254; 3,402,159; 3,297,793; 3,265,765; and 3,594,452 and UK Patent No. 1,264,741, all herein incorporated by reference. Exemplary of typical species of AB block copolymers there may be given:

polystyrene-polybutadiene (SBR)
polystyrene-polyisoprene and
poly(alpha-methylstyrene)-polybutadiene. Such AB block copolymers are available commercially from a number of sources including Phillips under the trademark Solprene.

Additionally, ABA triblock copolymers and processes for their production as well as hydrogenation, if desired, are disclosed in U.S. Pat. Nos. 3,149,182;

3,231,635; 3,462,162; 3,287,333; 3,595,942; 3,694,523 and 3,842,029, all incorporated herein by reference.

Exemplary of typical species of triblock copolymers there may be given:
polystyrene-polybutadiene-polystyrene (SBS)
polystyrene-polyisoprene-polystyrene (SIS)
poly(alpha-methylstyrene)-polybutadiene-poly(alpha-methylstyrene) and
poly(alpha-methylstyrene)-polyisoprene-poly(alpha-methystyrene). A particularly preferred class of such triblock copolymers are available commercially as CARIFLEX ®, KRATON D ® and KRATON G ® from Shell.

A third class of modifier resins suitable for use in the instant invention are those derived from conjugated dienes. While many copolymers containing conjugated dienes have been discussed above, additional conjugated diene modifier resins include for example homopolymers and copolymers of one or more conjugated dienes including for example polybutadiene, butadiene-styrene copolymers, isoprene-isobutylene copolymers, chlorobutadiene polymers, butadiene-acrylonitrile copolymers, polyisoprene, and the like. Finally, ethylene-propylene-diene monomer rubbers are also intended to be within the full scope of the present invention. These EPDMs are typified as comprising prodominately ethylene units, a moderate amount of propylene units and only a minor amount, up to about 20 mole % of diene monomer units. Many such EPDM's and processes for the production thereof are disclosed in U.S. Pat. Nos. 2,933,480; 3,000,866; 3,407,158; 3,093,621 and 3,379,701, herein incorporated by reference.

An additional group of modifier resins employable in the instant invention are the core-shell type graft copolymers. In general, these are characterized as having a predominately conjugated diene rubbery core or a predominately cross-linked acrylate rubbery core and one or more shells polymerized thereon and derived from monoalkenyl arene and/or acrylic monomers alone or, preferably, in combination with other vinyl monomers. Such core-shell copolymers are widely available commercially, for example, from Rohm and Haas Company under the tradenames KM-611, KM-653 and KM-330, and are described in U.S. Pat. Nos. 3,808,180; 4,034,013; 4,096,202; 4,180,494 and 4,292,233.

Also within the scope of the present invention are the core-shell copolymers wherein an interpenetrating network of the resins employed characterizes the interface between the core and shell. Especially preferred in this regard are the ASA type copolymers available from General Electric Company and sold as GELOY ™ resin and described in U.S. Pat. No. 3,944,631.

It is also to be understood that in addition to the straight polymers and copolymers described above, there may be employed such polymers and copolymers having copolymerized therewith or grafted thereon monomers having functional groups and/or polar or active groups. Exemplary of such functional groups there may be given epoxy, amine, amide, thio, ether, ester, carboxy, anhydride, carboxylic acid anhydride, carbonyl, and other highly polar groups. Such functionalized or activated polymers and copolymers are described in the above-mentioned Epstein, Novak, Roura, Joffrion, Caywood, Swiger and Gallucci references cited above with respect to the discussion on toughened polyamides. All of such functionalized or activated polymers and copolymers may be directly blended with the ingredients to the present compositions or, as described above, may be precompounded with a polyamide or polyphenylene ether. It is especially preferred to precompound the functionalized or activated rubbery polymer or copolymer with the polyamide to prepare a toughened or super tough polyamide which is then employed in preparing the polyphenylene ether-polyamide composition of the present invention.

Finally, other suitable modifier resins and high molecular weight rubbery materials which may be employed in the practice of the present invention include for example thiokol rubber, polysulfide rubber, polyurethane rubber, polyether rubber (e.g. polypropylene oxide), epichlorhydrin rubber, ethylene propylene rubber, thermoplastic polyester elastomers, thermoplastic ether-ester elastomers and the like.

The amount of the rubbery polymer used will be up to about 100 parts by weight, preferably from about 5 to about 50 parts by weight most preferably from about 5 to about 25 parts by weight, based on 100 parts by weight of a mixture of polyphenylene ether and polyamide. However, when the amount is less than 2 parts by weight, the effect of the rubbery polymer to improve impact resistance is poor. When the amount is more than 100 parts by weight, the impact resistance is much improved, however, some loss of other physical properties may result. Thus, in the interest of balancing impact resistance and other physical properties, it is preferred to use less than 100 parts by weight of the rubbery polymer. It is also to be understood that combinations of the above-mentioned modifier resins may be employed and are within the full intended scope of the present invention.

Finally, in addition to the foregoing, the polyphenylene ether-polyamide resin compositions of the present invention may further comprise other reinforcing additives, including glass fibers, carbon fibers, mineral fillers and the like as well as various flame retardants, colorants, stabilizers and the like known to those skilled in the art.

When employed in the practice of the present invention, reinforcing additives should be used in an amount up to no more than about 50 wt. % based on the total composition, preferably no more than about 30 wt. %. Especially preferred reinforcing additives are the filamentous and chopped glass fibers. Such glass fibers may be untreated or, preferably, treated with a silane or titanate coupling agent, and are well known in the art and widely available from a number of manufacturers.

Suitable stabilizers for use in the practice of the present invention generally include most any of the known thermal and oxidative stabilizers suitable for use with either polyamides or polyphenylene ethers. Especially preferred are those stabilizers suitable for use with polyamides. For example, liquid phosphates and hindered phenols may be employed as well as stabilizer packages encompassing combinations of hindered phenols and potassium and cuprous salts.

The method for producing the resin compositions of the present invention is not particularly limited, and the conventional methods are satisfactorily employed. Generally, however, melt blending methods are desirable. The time and temperature required for melt-blending are not particularly limited, and they can properly be determined according to the composition of the material. The temperature varies somewhat with the blending ratio of the polyphenylene ether to total polyamide, but it is generally within a range of 270° to 350° C. A prolonged time and/or a high shear rate is desirable for mixing, but the deterioration of the resin composition advances. Consequently, the time needs to be determined taking into account these points.

Any of the melt-blending methods may be used, if it can handle a molten viscous mass. The method may be applied in either a batchwise form or a continuous form. Specifically, extruders, Bambury mixers, rollers, kneaders and the like may be exemplified.

While all ingredients may be initially and directly added to the processing system, as mentioned above, one may also prepare the compositions by precompounding two or more ingredients. Where precompounding is practiced, essentially any system or schematic of precompounding may be followed. For example, one may precompound the amorphous and crystalline polyamide prior to compounding with the polyphenylene ether. Alternatively, as specifically mentioned above, one may precompound the compatibilizing agent and/or the impact modifier resin with either or the same polymer prior to blending with the other. Such precompounding may be performed in two or more separate extrusions or in a single extrusion utilizing extrusion apparatus having mutliple feed parts along the barrel whereby only certain of the ingredients are initially fed into the throat of the screw and the remaining ingredients at any one of the downstream feed parts.

Although the exact physical configuration of the compositions of the present invention is not known, it is generally believed that the compositions comprise a dispersion of one polymer component in the other. Applicant believes the likely configuration is wherein the polyphenylene ether is dispersed in a polyamide matrix, the polyamide matrix comprising a blend of crystalline and amorphous polyamide. However, the inverse may also be possible particularly where the polyamide component is present in only a minor amount. Where the compatibilizing agent is employed, applicant contemplates that there may be present in the products produced thereby some graft polyphenylene ether-polyamide products wherein the compatibilizing agent may, at least in part, promote grafting and/or act as a graft-linking agent itself. Thus, all such dispersions as well as graft, partially grafted and non-grafted products are within the full intended scope of the invention.

The following examples are presented in order that those skilled in the art may better understand how to practice the present invention. These examples are merely presented by way of illustration and are not intended to limit the invention thereto. Unless otherwise stated, all formulations are expressed in terms of parts by weight.

EXAMPLES 1-3, COMPARATIVE EXAMPLES A-B

A series of compositions within and outside the scope of the present invention were prepared. All compositions were prepared on a single screw extruder by direct addition of ingredients and extruded at 300° C. The extrudate was pelletized and injection molded to form test parts for physical property profile determination. The specific compositions and the physical properties thereof were so shown in Table 1.

TABLE 1

| Example | A | 1 | 2 | 3 | B |
|---|---|---|---|---|---|
| polyphenylene oxide[a] | 45 | 45 | 45 | 45 | 45 |
| polyamide 6,6[b] | 45 | 35 | 22.5 | 10 | — |
| polyamide 6.I/T[c] | — | 10 | 22.5 | 35 | 45 |

TABLE 1-continued

| Example | A | 1 | 2 | 3 | B |
|---|---|---|---|---|---|
| Triblock Copolymer[d] | 10 | 10 | 10 | 10 | 10 |
| Maleic Anhydride | 0.35 | 0.35 | 0.35 | 0.35 | 0.35 |
| Notched Izod, ft.lb./in. | 2.3 | 10.4 | 14.1 | 7.1 | 5.0 |
| % Elongation | 31 | 63 | 81 | 22 | 49 |

[a]poly(2,6-dimethyl-1,4-phenylene)ether from General Electric Company
[b]Crystalline polyamide from E. duPont
[c]Amorphous polyamide from E. I. duPont derived from hexamethylene diamine and a mixture of isophthalic and terephthalic acids.
[d]Styrene-hydrogenated butadiene-styrene tri-block copolymer from Shell.

As can be seen from the examples, the compositions within the scope of the present invention had a surprisingly and significantly improved impact strength as compared to similar compositions employing only an amorphous polyamide or a crystalline polyamide. Furthermore, except in the case of the higher level of crystalline polyamide these compositions also had unexpectedly improved elongation.

EXAMPLES 4-6, COMPARATIVE EXAMPLES C-D

A second series of compositions were prepared as described above, however, substituting polyamide 6-(3)-T which is an amorphous polyamide derived from terephthalic acid and trimethylhexamethylene diamine for polyamide 6-I/T. The compositions and the physical properties thereof were as shown in Table 2.

Once again, from the results shown in Table 2, it can be seen that the combination of crystalline and amorphous polyamide in a polyphenylene ether-polyamide blend composition provides unexpectedly high impact strength and tensile elongation. Furthermore, it can also be seen that water absorption is greatly and significantly reduced by the practice of the present invention.

TABLE 2

| Example | C | 4 | 5 | 6 | D |
|---|---|---|---|---|---|
| polyphenylene ether[a] | 45 | 45 | 45 | 45 | 45 |
| polyamide 6,6[b] | — | 10 | 22.5 | 35 | 45 |
| polyamide 6-(3)-T[c] | 45 | 35 | 22.5 | 10 | — |
| triblock copolymer[d] | 10 | 10 | 10 | 10 | 10 |
| maleic anhydride | 0.35 | 0.35 | 0.35 | 0.35 | 0.35 |
| Notched Izod, ft.lb./in. | 3.5 | 8.9 | 13.6 | 5.7 | 4.8 |
| % Elongation | 15 | 15.3 | 24 | 28 | 30 |
| Water expansion[e] mils/in. | 2.3 | (2.2) | 1.4 | 4.9 | 7.8 |

[a]poly(2,6-dimethyl-1,4-phenylene)ether from General Electric Company
[b]crystalline polyamide 6,6 from E.I. duPont
[c]amorphous polyamide from Dynamit Nobel
[d]poly(styrene-hydrogenated butadiene-styrene) triblock copolymer
[e]determined by immersion in water at 75° C. for 40 hours.

Obviously, other modifications and variations of the present invention are possible in light of the above teachings. It is therefore to be understood that changes may be made in the particular embodiments of the invention described which are within the full intended scope of the invention as defined by the appended claims.

I claim:

1. An improved polyphenylene ether-polyamide composition comprising:
   (a) 100 parts by weight of a combination of
      (i) 5 to 95 percent by weight of a polyphenylene ether, and
      (ii) 5 to 95 percent by weight of a polyamide component which comprises a combination of an amorphous polyamide and a crystalline polyamide;

(b) 0.01 to 30 parts by weight of a non-rubbery compatibilizing agent; and (c) 5 to 100 parts by weight of a modifier resin selected from the group consisting of:
  (i) rubber-modified polystyrene; and
  (ii) a functionalized rubber polymer or copolymer; wherein the functional group is selected from the group consisting of epoxy, amine, amide, thio, ether, ester, carboxy, anhydride, and carbonyl groups.

2. The composition of claim 1 wherein the weight ratio of amorphous polyamide to crystalline polyamide is from about 9:1 to 1:9.

3. The composition of claim 1 wherein the weight ratio of amorphous polyamide to crystalline polyamide is from about 7:3 to about 3:7.

4. The composition of claim 1 wherein the amorphous polyamide is derived from at least one aromatic dicarboxylic acid of 8-18 carbon atoms and at least one diamine selected from the class consisting of (i) 2-12 carbon aliphatic straight-chained diamines and (ii) 8-20 carbon cycloalphatic diamines containing at least one cycloalphatic ring.

5. The composition of claim 4 wherein the aromatic dicarboxylic acid is selected from the group consisting of isophthalic acid, terephthalic acid and mixtures thereof.

6. The composition of claim 4 wherein the diamine is selected from hexamethylene diamine, trimethyl hexamethylene diamine, bis (p-amino cyclohexyl) methane isomers, and mixtures thereof.

7. The composition of claim 4 wherein the amorphous polyamide is derived from hexamethylene diamine and a mixture of isophthalic and terephthalic acids.

8. The composition of claim 4 wherein the amorphous polyamide is derived from trimethylhexamethylene diamine and terephthalic acid.

9. The composition of claim 1 wherein the crystalline polyamide is selected from the group consisting of polyamide 6, polyamide 6/6, polyamide 12 and polyamide 6/10.

10. The composition of claim 1 wherein the polyphenylene ether is a homopolymer or a copolymer having units with the repeating structural formula:

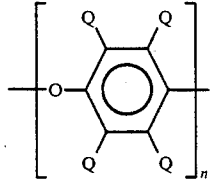

wherein the oxygen ether atom of one unit is connected to the benzene nucleus of the next and joining unit, and n is a positive integer and is at least 50, and each Q is independently a monovalent substituent selected from a group consisting of hydrogen, halogen, hydrocarbon and hydrocarbonoxy groups free of a tertiary alpha-carbon atom and halohydrocarbon and halohydrocarbonoxy groups free of a tertiary alpha-carbon atom and having at least 2 carbon atoms between the halogen atom and the phenyl nucleus.

11. The composition of claim 1 wherein the polyphenylene ether is poly(2,6-dimethyl-1,4-phenylene)ether.

12. The composition of claim 1 wherein the combination of polyphenylene ether and polyamide comprises 30 to 70 percent by weight polyphenylene ether and 70 to 30 percent by weight polyamide.

13. The composition of claim 1 wherein the compatibilizing agent is employed in an amount of from about 0.1 to 10 parts by weight per 100 parts by weight of the admixture of polyphenylene oxide and polyamide.

14. The composition of claim 1 wherein the compatibilizing agent is employed in an amount of from 0.1 to about 5 parts by weight per 100 parts by weight of the admixture of polyphenylene ether and polyamide.

15. The composition of claim 1 wherein the modifier resin is present in an amount of up to about 50 parts by weight, based on the total composition.

16. The composition of claim 1, wherein the compatibilizing agent is selected from the group consisting of:
  (i) liquid diene polymers;
  (ii) epoxy compounds;
  (iii) oxidized polyolefin wax;
  (iv) organosilane compounds having in the molecule both (a) at least one silicon bonded to carbon through an oxygen link, and (b) a component selected from the group consisting of:
    (I) at least one ethylenic carbon-carbon double bond or carbon-carbon triple bond;
    (II) a functional group selected from the group consisting of an amino group or a mercapto group; and
    (III) a combination of (I) and (II);
  (v) polyfunctional compounds having in the molecule (A) and (a) at least one ethylenic carbon-carbon double bond or carbon-carbon triple bond and (b) at least one carboxylic acid, acid halide, anhydride, acidamide, acid ester, imido, amino or hydroxyl group; (B) both (a) a group represented by the formula (—OR), wherein R is hydrogen or an alkyl, aryl, acyl or carbonyl dioxy group, and (b) at least two groups, each of which may be the same or different, selected from carboxylic acid, acid halide, anhydride, acid ester, acid amide, imido, amino and salts thereof; or (C) both (a) an acid halide group and (b) a carboxylic acid or a carboxylic acid anhydride group.

* * * * *